Oct. 1, 1963 IKURO MORIYA 3,105,880

MAGNETIC TRANSDUCER WITH SEQUENTIALLY SCANNING HEADS

Filed July 21, 1961 3 Sheets-Sheet 1

INVENTOR.
Ikuro Moriya
BY
Pierce, Scheffler & Parker
Attorneys

MAGNETIC TRANSDUCER WITH SEQUENTIALLY SCANNING HEADS

Filed July 21, 1961 3 Sheets-Sheet 2

INVENTOR.
Ikuro Moriya
BY
Pierce Scheffler & Parker
Attorneys

Oct. 1, 1963 IKURO MORIYA 3,105,880

MAGNETIC TRANSDUCER WITH SEQUENTIALLY SCANNING HEADS

Filed July 21, 1961 3 Sheets-Sheet 3

INVENTOR.
Ikuro Moriya
BY
Pierce, Scheffler & Parker
Attorneys

United States Patent Office 3,105,880
Patented Oct. 1, 1963

3,105,880

MAGNETIC TRANSDUCER WITH SEQUENTIALLY SCANNING HEADS

Ikuro Moriya, Kanagawa-ku, Yokohama, Japan, assignor to Victor Company of Japan, Limited, Yokohama, Japan, a corporation of Japan

Filed July 21, 1961, Ser. No. 125,801
Claims priority, application Japan Sept. 14, 1960
1 Claim. (Cl. 179—100.2)

This invention relates to a magnetic recording and reproducing apparatus wherein recorded tracks are alternately formed in the directions toward both side edges from the longitudinal center line or in the direction reverse to them on the magnetic coated surface of a magnetic recording sheet continuously moving in the horizontal state by using a plurality of magnetic heads.

There has already been suggested a system of this type wherein, while one or alternately a plurality of magnetic heads are kept in contact with the magnetic coated surface of a stationary magnetic recording sheet, said magnetic heads are moved with respect to the magnetic sheet so that recording and reproduction may be carried out. However, in such system, not only the mechanism is complicated but also, as the magnetic sheet is not moved, it is impossible to carry out continuous recording and reproduction for a long time. Further, there is a disadvantage that, if continuous recording and reproduction for a long time are to be carried out the apparatus will have to be large in size. There is a defect that, in the case of transferring the magnetic sheet recorded in such system, the recording direction of the recorded track of the thus transferred magnetic sheet will be reverse to the recorded direction of the original sheet and that, therefore, in the case of carrying out reproduction from said transferred sheet, the magnetic head will have to be moved in the direction reverse to that in recording. The present invention has been suggested to eliminate the above mentioned defects.

A principal object of the present invention is to carry out continuous recording and reproduction for a long time by efficiently using the recording surface of a magnetic sheet.

Another object of the present invention is to provide a mangetic recording and reproducing apparatus whereby transferring from a recorded magnetic sheet is easy.

The present invention shall now be explained with reference to the drawings.

Figure 5:
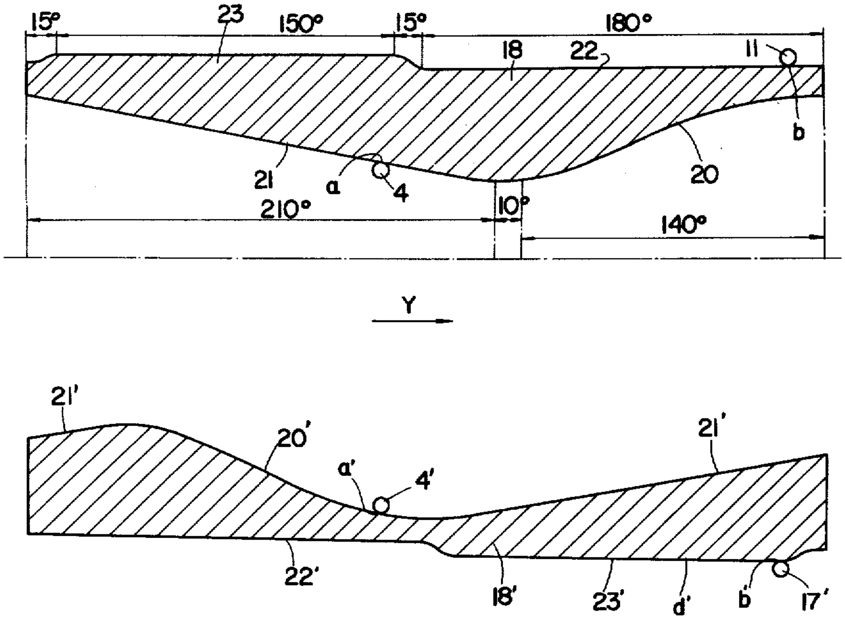
FIGURE 5 is a developed view of the cam profile.

1 and 1' are magnetic head supporting arms. Cylindrical rotary shafts 2 and 2' are fixed to the base end parts of the respective supporting arms. A guide frame 3 is integrally formed at the free end of each supporting arm. Horizontal cam followers 4 and 4' are pivoted to the substantially middle lower surfaces of the respective rods. A sliding guide rod 6 fitted with a magnetic head 5 or 5' at the upper end and a spring 7 to normally push up said guide rod and magnetic head are provided in the guide frame 3. The cylindrical rotary shafts 2 and 2' are rotatably borne in cylindrical bearings 8 and 8', respectively. 9 and 9' are head elevating levers pivoted with pins 10 and 10' substantially in the middles of said supporting arms 1 and 1', respectively. Head spacing adjusting screws 11 and 11' are screwed in at the right ends of the respective levers. Leaf springs 12 and 12' are pressed against the lower surfaces of the respective screws. Further, said leaf springs 12 and 12' are kept in contact with the upper surfaces of the head push-down arms 13 and 13' fixed at one end to the magnetic heads 5 and 5', respectively. 14 and 14' are elevating connecting rods inserted in said cylindrical rotary shafts 2 and 2', respectively. Said elevating connecting rods have the upper ends in contact with the lower surfaces of the left ends of said elevating levers 9 and 9', respectively, and have the lower ends in contact with the left ends of levers 15 and 15', respectively. Said levers 15 and 15' are pivoted in the middle to bearings 16 and 16', respectively. Vertical pulleys 17 and 17' are pivoted to the right ends of the respective levers. 18 and 18' are cam wheels fixed to the respective ends of a rotary shaft 19. As shown in FIGURE 5, parabolic cam profiles 20 and 20' are formed on about half peripheries of the opposed surfaces of said cam wheels 18 and 18' and inclined linear cam profiles 21 and 21' are formed on the other about half peripheries, respectively. Lower cam profiles 22 and 22' are formed on about half outer peripheries of said cam wheels 18 and 18' and upper cam profiles 23 and 23' are formed on the other about half peripheries, respectively. The embodiment shown in FIGURE 5 is so designed that each of the parabolic cam profiles 20 and 20' may be in the range of 140 degrees, each of the inclined linear cam profiles 21 and 21' may be in the range of 210 degrees and the joint surface of both cam profiles may be in the range of 10 degrees. It is also so designed that each of the upper cam profiles 23 and 23' may be in the range of 150 degrees, each of the lower cam profiles 22 and 22' may be in the range of 180 degrees and the joint surface of both cam profiles may be in the range of 15 degrees. 24 is a tension spring stretched between the base ends of said head supporting arms 1 and 1'. Said horizontal cam followers 4 and 4' are to be pressed against the cam profiles 20 and 20' or 21 and 21' of the cam wheels 18 and 18', respectively, by the tension of said spring 24. Both vertical pulleys 17 and 17' are to be pressed against the cam profiles 22 and 22' or 23 and 23' on the outer peripheries of both cam wheels 18 and 18', respectively. 24' is a driving wheel fixed to one end of the rotary shaft 19. 25 and 25' are sprocket wheels. 26 is a magnetic sheet. 27 is a sheet guiding plate. Said magnetic sheet 26 is to move rightward or leftward by sliding on the upper surface of the guiding plate 27 by being pulled by the sprocket wheels 25 and 25'.

Now, in carrying out recording or reproduction of the magnetic sheet 26 by the apparatus of the present invention, when said magnetic sheet 26 is moved in the direction indicated by the arrow X along the guiding plate 27 by the sprocket wheels 25 and 25' and at the same time both cam wheels 18 and 18' are rotated in the direction indicated by the arrow Y by the driving wheel 24', both magnetic heads 5 and 5' will be moved as pressed against the lower surface or the magnetic coated surface of the magnetic sheet 26. This operation shall now be explained with reference to FIGURES 5 and 8. When the horizontal cam followers 4 and 4' of the head supporting arms 1 and 1' are brought into contact with a point *a* on the inclined linear cam profile 21 of the cam wheel 18 and a point *a'* on the parabolic cam profile 20' of the cam wheel 18', respectively, the vertical pulleys 17 and 17' are brought into contact with a point $b$ on the lower cam profile 22 of the cam wheel 18 and a point $b'$ on the upper cam profile 23' of the cam wheel 18', respectively, and both cam wheels 18 and 18' are rotated in the direction indicated by the arrow Y, the horizontal cam follower 4 of one head supporting arm 1 will slide on the inclined linear cam profile 21 of the cam wheel 18 in the direction reverse to that indicated by the arrow Y and the vertical pulley 17 will slide on the lower cam profile 22 of the cam wheel 18 in the direction reverse to that indicated by the arrow Y, therefore the magnetic head 5 attached to the forward end of the head supporting arm 1 will move at a constant speed toward the side edge $d$ from the center line $c$ while in contact with the lower surface of the magnetic sheet 26 and thereby the record of such loci as are shown by $e$ on the lower surface of the magnetic sheet 26 will be made. At this time, the horizontal cam follower 4' of the other head supporting arm 1' will slide on the parabolic cam profile 20' of the cam wheel 18' in the direction reverse to that indicated by the arrow Y and the vertical pulley 17' will slide on the upper cam profile 23' in the direction reverse to that indicated by the arrow Y and therefore the magnetic head 5' attached to the forward end of the head supporting arm 1' will move a little faster than the other magnetic head 5 toward the center line $c$ from the side edge $d'$ while separating from the lower surface of the magnetic sheet 26. Then, as the lengths of the parabolic cam profile 20' and the upper cam profile 23' are a little shorter than the length of the inclined linear cam profile 21, a little before the magnetic head 5 reaches the last end on the side of the side edge $d$, the horizontal cam follower 4' and the vertical pulley 17' will slide as transferred onto the inclined linear cam profile 21' and the lower cam profile 22', respectively. Thereby the magnetic head 5' will come into contact with the lower surface near the center line $c$ of the magnetic sheet 26, will move in such state toward the side edge $d'$ from the center line $c$ and will form such recorded tracks as are shown by $e'$. Further, in this process, after the horizontal cam follower 4 separates from the inclined linear cam profile 21 and transfers onto the parabolic cam profile 20 and the vertical pulley 17 transfers onto the upper cam profile 23, the magnetic head 5 will separate from the lower surface of the magnetic sheet 26 and will move toward the center line $c$ from the side edge $d$.

For some time while the magnetic heads 5 and 5' are simultaneously in contact with the lower surface of the magnetic sheet 26 as mentioned above, both magnetic heads 5 and 5' will simultaneously record signals on the lower surface of the magnetic sheet 26. This is to prevent the record from becoming discontinuous when the magnetic head transfers from the recording track $e$ to $e'$.

Figure 1:
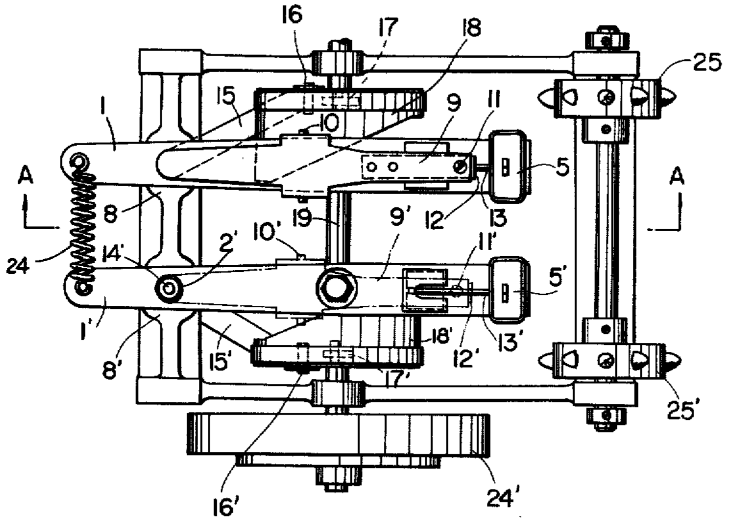
FIGURE 1 is a plan view of an embodiment of the apparatus of the present invention.
Figure 6:
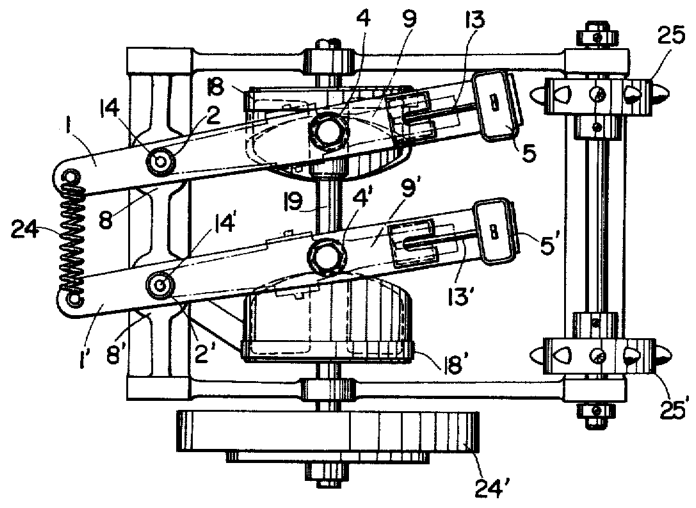
FIGURES 6 and 7 are explanatory views of the operation of the apparatus of the present invention.
Figure 2:
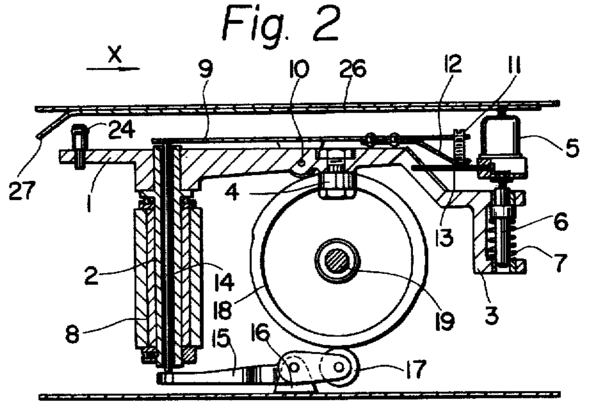
FIGURE 2 is a cross-sectioned view on line A—A in FIGURE 1.
Figure 7:
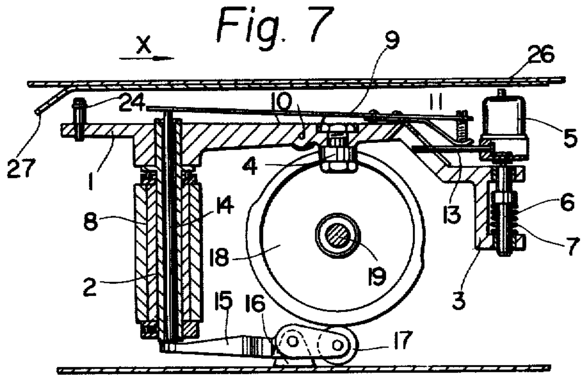
Figure 8:
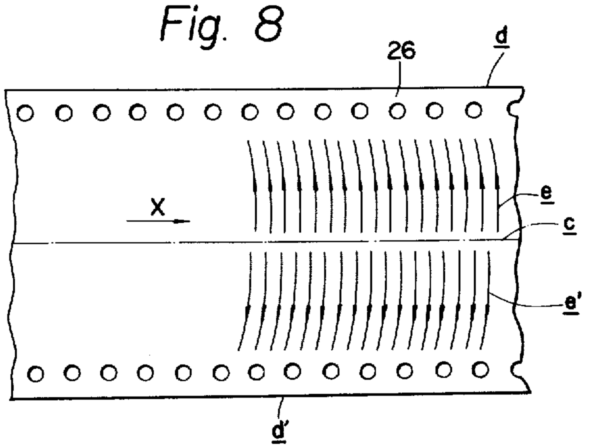
FIGURE 8 is a plan view of a magnetic sheet recorded by the apparatus of the present invention.
Figure 3:
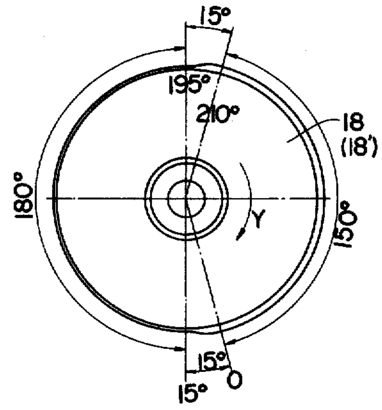
FIGURE 3 is an elevation of a cam wheel in the apparatus of the present invention.
Figure 4:
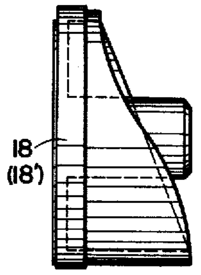
FIGURE 4 is a side view thereof.

In the apparatus according to the present invention, by repeating such operation as is described above, a plurality of recorded tracks of such loci as are shown by $e$ and $e'$ in FIGURE 8 can be formed on the lower surface of the magnetic sheet 26.

In the apparatus according to the present invention, as explained above, a plurality of recorded tracks can be formed in turn in the traverse direction of a magnetic sheet symmetrically toward both side edges on the magnetic coated surface of the magnetic sheet with its center line as a boundary and, as this magnetic sheet is fed continuously, continuous recording and reproduction for a long time can be made by efficiently using the recording surface of the magnetic sheet. Further, as the recording directions of the recorded tracks on the magnetic sheet by the apparatus of the present invention are symmetrical on the right and left of the center line of the sheet, in the case of making transfer by placing a new magnetic sheet on the sheet recorded by this apparatus, the recorded direction of the transferred magnetic sheet and that of the original magnetic sheet will be exactly identical with each other. Therefore, recorded magnetic sheets which are easy to transfer can be obtained according to the present invention.

Further, in the apparatus of the present invention, it is possible to make recording toward the center line from both side edges on the magnetic sheet.

What I claim is:

A magnetic recording and reproducing apparatus comprising two magnetic head supporting arms which are parallel with each other and each of which is pivoted for movement in a horizontal direction at the base end and has a magnetic head attached to the free end and a horizontal cam follower mounted substantially in the middle of the arm, two cam wheels each of which has an inclined linear cam profile and a parabolic cam profile formed on the periphery of the inside surface and an upper cam profile and a lower cam profile formed on the outer periphery, a driving shaft having both cam wheels fixed at both ends so that the inclined linear cam profile and upper cam profile of one cam wheel may be opposite the parabolic cam profile and lower cam profile of the other cam wheel, two levers each of which has a vertical pulley rotatable about a horizontal axis provided at one end and has the other end engaged with the lower end of an elevating connecting rod, and two head elevating levers each of which has the middle pivoted for movement in a vertical direction substantially in the middle of said magnetic head supporting arm, has the rear end engaged with the upper end of said elevating connecting rod and has the front end engaged with said magnetic head, each of said cam wheels having said horizontal cam follower pressed against the inclined linear cam profile and parabolic cam profile and said vertical pulley pressed against the upper cam profile and lower cam profile.

References Cited in the file of this patent

UNITED STATES PATENTS 3,020,355 Moriya ---------------- Feb. 6, 1962